UNITED STATES PATENT OFFICE.

AUGUSTE J. ROSSI, OF NIAGARA FALLS, NEW YORK, AND CHRISTIAN M. EDWARD SCHROEDER, OF RUTHERFORD, NEW JERSEY, ASSIGNORS TO THE TITANIUM ALLOY MANUFACTURING COMPANY, OF NEW YORK, N. Y., A CORPORATION OF MAINE.

PAINT.

1,205,268. Specification of Letters Patent. Patented Nov. 21, 1916.

No Drawing. Original application filed November 19, 1912, Serial No. 732,195. Divided and this application filed May 7, 1915. Serial No. 26,503.

*To all whom it may concern:*

Be it known that we, AUGUSTE J. ROSSI and CHRISTIAN M. EDWARD SCHROEDER, both citizens of the United States, and residents, respectively, of Niagara Falls, in the county of Niagara and State of New York, and of Rutherford, in the county of Bergen and State of New Jersey, have jointly invented certain new and useful Improvements in Paints, of which the following is a specification.

Our invention relates to paints, thereby meaning the well known substances applied to surfaces for coloration or protection, etc., at present usually composed of a pigment such as white lead or zinc oxid ground together with such vehicle as the well known drying oils, as for instance linseed oil, and applied in the usual manner by brushing or the like to the surface treated, and our present application for patent is a division of our pending application Serial Number 732,195 filed November 19, 1912.

The objects of our invention comprise the improvement of such paints in their covering, or hiding qualities, their durability, resistance to the weather, and to destructive or discoloring agents present, for instance, as in foul air, or in vapors charged with hydrogen sulfid, etc., and also to produce paints having these improved qualities, at less cost than the best paints heretofore manufactured.

We have discovered that titanic oxid, as such, now procurable in quantity as an amorphous powdered product containing a high percentage, say from 96% to 99% of chemically uncombined $TiO_2$, said powder being white when of highest purity, or slightly yellowish or buff in shade in proportion to the presence, if any, of minute quantities of iron oxid uncombined with said $TiO_2$ is, owing to the peculiar properties of such $TiO_2$, capable of attaining our said objects when, in production of paint, substituted, in whole or in part, for the heretofore employed pigments, as, for example, white lead or zinc oxid.

To produce our novel paint we proceed as heretofore practised in the preparation of any desired paint, excepting that, in lieu of the pigment formerly therein employed, we substitute, altogether, or to such extent as desired, a quantity of titanic oxid in finely powdered state, being, for example, that contained in the amorphous powder above referred to.

Further description is, we believe, unnecessary to enable those skilled in the art to produce our said paints, since it follows that our titanic-oxid pigment is mixed, or also ground, with a drying oil, such as linseed oil, or other suitable vehicle, such as dissolved gum or other varnish, in substantially the same proportions and manner as white lead or zinc oxid, and is then ready for application, in any convenient manner, to the surfaces to be covered, as by brushing on, or otherwise.

It will be understood that the whiteness of our resulting paint, other things being equal, is proportional to the amount of pure or uncombined $TiO_2$ supplied thereto by the aforesaid amorphous powder employed as pigment; also that its improved qualities are proportional to the extent to which such titanic oxid is substituted for said hitherto employed pigments, the ideal embodiment of our invention being a paint the entire pigment of which is such titanic oxid.

Among the numerous advantages and superior qualities attributable to our said novel paint we note that it is uninjurious to animal life in proportion to its content of harmless titanic oxid as compared to poisonous white lead or zinc oxid; also that it has superior covering, or hiding power as compared with that of any other paints known to us; also that it has superior resistance to agencies tending to discolor and deteriorate previously employed paints, this being, we believe, attributable to the comparative stability of titanic oxid; and also that it is more economical of production at the present cost of titanic oxid compared with white lead or oxid of zinc.

We are aware that, prior to our invention, the incorporation into pigments of titanic oxid in crystalline form, or in chemical combination with other substances has been suggested, the which we do not claim as our invention which consists broadly in our discovery that only in its amorphous form and chemically uncombined with other substances can titanic oxid in paints produce the best, if indeed any satisfactory, results.

Having now described our invention, what we claim as new and desire to secure by Letters Patent is the following, viz:

1. Paint containing white lead and also another pigment containing amorphous titanic oxid ($TiO_2$) uncombined chemically with other substances.

2. Paint containing white lead and also a slightly yellowish or buff pigment containing some iron oxid and more amorphous titanic oxid ($TiO_2$) uncombined chemically with other substances.

3. Paint containing white lead, and also a slightly yellowish or buff pigment which contains iron oxid and not less than 96% of amorphous titanic oxid ($TiO_2$) uncombined chemically with other substances.

4. Paint containing white lead, and amorphous titanic oxid ($TiO_2$) uncombined chemically with other substances.

5. Paint containing white lead, iron oxid, and also amorphous titanic oxid ($TiO_2$) uncombined chemically with other substances.

6. Paint containing white lead and more titanic oxid ($TiO_2$) uncombined chemically with other substances.

AUGUSTE J. ROSSI.
CHRISTIAN M. EDWARD SCHROEDER.

Witnesses:
WILLIAM J. HOPKINS,
WILLIAM C. MANGNER.